Figure 1:
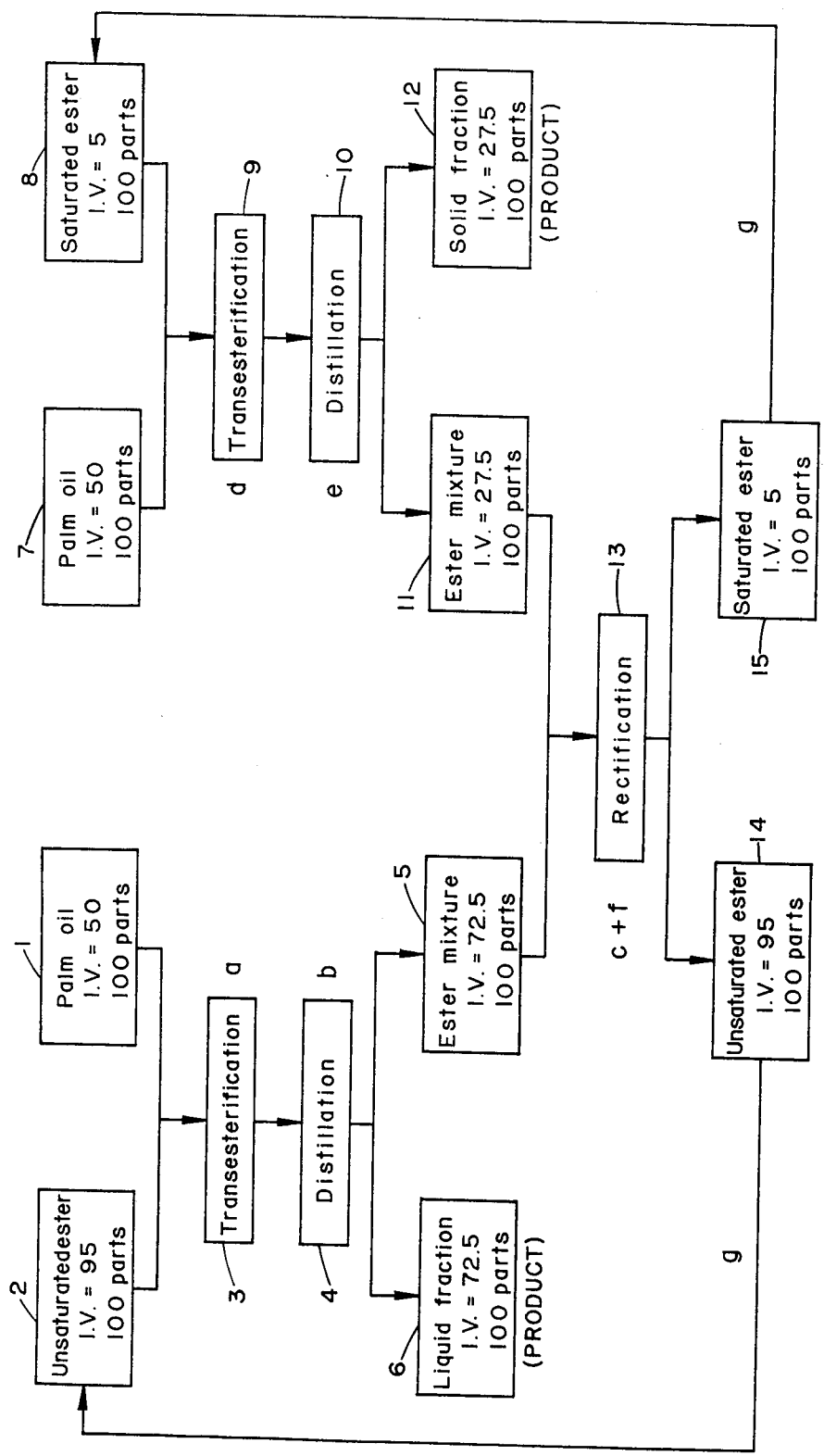

United States Patent [19]

Koslowsky

[11] 4,004,041

[45] Jan. 18, 1977

[54] PRODUCTION OF LIQUID EDIBLE OIL FROM PALM OIL OR SIMILAR OILS

[75] Inventor: Ladislav Koslowsky, Ramat-Gan, Israel

[73] Assignee: H.L.S. Ltd., Industrial Engineering Company, Petah-Tikva, Israel

[22] Filed: Sept. 12, 1975

[21] Appl. No.: 612,982

[30] Foreign Application Priority Data

Nov. 22, 1974 Israel .................................. 46106

[52] U.S. Cl. .............................. 426/601; 426/417; 260/410.7

[51] Int. Cl.[2] ......................................... A23D 5/00

[58] Field of Search ................ 260/410.7; 426/601, 426/417

[56] References Cited

UNITED STATES PATENTS

| | | | |
|---|---|---|---|
| 2,418,898 | 4/1947 | Murphy et al. .................. | 260/410.7 |
| 3,170,798 | 2/1965 | Burgers ............................. | 426/601 |
| 3,512,994 | 5/1970 | Brown et al. ...................... | 426/601 |

*Primary Examiner*—Joseph M. Golian
*Attorney, Agent, or Firm*—Ladas, Parry, Von Gehr, Goldsmith & Deschamps

[57] ABSTRACT

Liquid edible oil is produced from palm oil or similar oils and fats. The fatty acid residues are redistributed between two batches of the starting oil by transesterification with ($C_1$–$C_3$)-alkanol esters of fatty acids. One batch is reacted with unsaturated fatty acid esters (first transesterification) and is thereby enriched with unsaturated fatty acid radicals, while the other batch is reacted with saturated esters (second transesterification) and is thereby enriched with saturated fatty acid radicals. In both transesterifications a mixture of saturated and unsaturated fatty acid esters is obtained, which is fractionated by vacuum distillation. The saturated esters obtained from the first transesterification are fed into the second one and, conversely, the unsaturated esters obtained from the second transesterification are fed into the first one.

14 Claims, 2 Drawing Figures

PRODUCTION OF LIQUID EDIBLE OIL FROM PALM OIL OR SIMILAR OILS

This invention relates to the production of oils and in particular to the production of edible unsaturated oils from palm oil.

The production of palm oil as a source of food fats has increased considerably in recent years and it is expected to become a leading new material in the world food industry. An important branch of the food fat industry is that of the so-called "salad oils," i.e. liquid unsaturated oils. Salad oils which include, e.g., cottonseed oil, sunflower seed oil, peanut oil and olive oil, are in growing demand, especially in view of their recent shortage. Although palm oil has been considered as a suitable source for a salad oil which could replace or supplement the conventional oils of this type, this possibility has not hitherto been exploited in an industrially feasible manner because up to the present invention no industrial technique has been proposed which would make it possible to obtain from palm oil an adequate amount of a liquid fraction having the desired characteristics of a salad oil. The most important of these characteristics is a good chilled stability at relatively low temperatures, namely a resistance of the oil to crystallization after being kept for 72 hours or longer at European winter temperatures or at a temperature of a moderately cool refrigerator. The chilled stability of an oil is a function of its iodine value which is the accepted measure of the degree of unsaturation of the oil. The higher the iodine value, the lower the temperature at which the oil still exhibits good chilled stability.

Attempts to produce salad oil from palm oil by the conventional techniques of fractional crystallization were unsuccessful, in that the liquid fractions obtained, though being of good quality, did not possess the desired chilled stability. This may be attributed to the unique distribution of the saturated and unsaturated fatty acid radicals in the triglyceride molecules of palm oil, as compared with other oils, as illustrated in the following Table I:

Table I

| Glycerides | GLYCERIDE COMPOSITION OF VARIOUS VEGETABLE OILS % Mol. | | | | | | |
|---|---|---|---|---|---|---|---|
| | Cottonseed Oil | Soybean Oil | Corn Oil | Olive Oil | Natural Palm Oil | Randomized Palm Oil | Transesterified Palm Oil - Liquid Fraction |
| Trisaturated SSS | 0.1 | — | — | 0–2 | 7 | 13 | 0.4 |
| Disat.-mono unsat. SSU | 13.2 | — | 2.2 | — | 49 | 38 | 6.5 |
| Monosat.-di- unsat. SUU | 58.4 | 57.6 | 40.3 | 45–43 | 38 | 37 | 34 |
| Triunsaturated UUU | 28.3 | 42.4 | 57.5 | 55 | 6 | 12 | 59 |

It can also be seen in the Table that the fatty acid radical distribution in palm oil cannot be changed significantly even by the known technique of "randomization". The last column in the Table shows the triglyceride composition of the liquid fraction obtained from palm oil in accordance with the present invention.

Palm oil is also unique in that palmitic acid constitutes the major portion of the saturated acids (about 45% of the total acids as compared to only 2.6% of stearic acid and 1.2% of myristic acid). The unsaturated fatty acids in palm oil consist mainly of the monounsaturated oleic acid (40.7% of the total acids) and the diunsaturated linoleic acid (10.7% of the total acids).

It follows that the two main triglyceride components of palm oil are oleodipalmitin and palmitodiolein, having the melting points 37.5° C and 19° C, respectively. These relatively high melting points limit the chilled stability of liquid fractions obtained from palm oil by fractional crystallization and consequently it has no hitherto been possible to obtain by these methods liquid fractions having a chilled stability lower than 18° C.

This has now been achieved by the present invention which provides a process for producing an improved edible liquid oil from a palmitic type oil (as hereinafter defined) which comprises the steps of:

a. reacting a portion of said oil with at least one unsaturated fatty acid ester of a ($C_1$–$C_3$)-alkanol, provided that where a mixture of two or more such esters is used, they are all derived from the same alkanol, in the presence of a transesterification catalyst, to form a first product mixture;

b. subjecting said first product mixture to distillation under reduced pressure not exceeding 40 Torr, thereby to obtain a first distillate being a mixture of alkanol esters of saturated and unsaturated fatty acids, and a first distillation residue being an edible liquid oil having a higher iodine value than said oil used as starting material;

c. subjecting said first distillate to fractional distillation under reduced pressure not exceeding 40 Torr, to separate it into a lower boiling saturated fatty acid ester fraction and a higher boiling unsaturated fatty acid ester fraction;

d. reacting the saturated fatty acid ester fraction obtained in step (c) with another portion of said oil in the presence of a transesterification catalyst to form a second product mixture;

e. subjecting said second product mixture to distillation under reduced pressure not exceeding 40 Torr, thereby to obtain a second distillate being a mixture of alkanol esters of saturated and unsaturated fatty acids, and a second distillation residue being an oil having a lower iodine value than said oil used as starting material;

f. subjecting said second distillate to fractional distillation under reduced pressure not exceeding 40 Torr, to separate it into a lower boiling saturated fatty acid ester fraction and a higher boiling unsaturated fatty acid ester fraction; and g. recycling and unsaturated fatty acid ester fractions obtained in steps (c) and (f) to the first transesterification step (a) and recycling the saturated fatty acid ester fraction obtained in step (f) to the second transesterification step (d).

The term "palmitic type oil" in this specification and appended claims means any animal and vegetable oil, fat or mixture of oils and/or fats, either natural or semi-processed, which fulfils the following conditions:
  i. the molar ratio of saturated to unsatured fatty acids is about 1:1, and
  ii. at least 90% of the saturated fatty acids contain not more than 16 carbon atoms in their molecule.

It is understood that the unsaturated fatty acids in practically all vegetable or animal fats and oils are of the $C_{18}$ type.

The invention is applicable, within the above definition, not only to vegetable and animal oils and fats but also to partially hydrogenated oils and fats and to certain fractions obtained in the course of conventional processing of natural oils and fats. Among the latter, there should be mentioned, in particular, the solid fractions obtained from the winterizing of cottonseed oil, sunflower seed oil, kapok seed oil, olive oil, whale oil, lard and butter.

The invention is based on the realization that in order to produce from a palmitic type oil, in a considerable yield, a liquid fraction having a good chilled stability, the fatty acid radicals in the triglycerides of the palmitic type oil must be redistributed. This is effectively achieved in accordance with the present invention by the use of the known transesterification technique, whereby, in a first transesterification reaction, the saturated fatty acid radicals (mainly palmitoyl) in the oleodipalmitin and palmitodiolein molecules of the palmitic type oil are partially replaced with unsaturated acid radicals so as to obtain a liquid fraction consisting mainly of triunsaturated and monosaturated-diunsaturated triglycerides (see Table I).

These unsaturated fatty acid radicals are derived in accordance with the invention from the triglycerides of another batch of the same palmitic type oil by a second transesterification, whereby the unsaturated fatty acid radicals in these triglycerides (mainly oleodipalmitin and palmitodiolein) are partially replaced with saturated fatty acid radicals (mainly palmitoyl). The process of the present invention thus yields concommitantly with the aforesaid liquid oil fraction, also a solid or "hard" oil fraction consisting almost exclusively of trisaturated triglycerides, in particular tripalmitin.

The invention thus resides in the combination of the two transesterification steps (a) and (d) in such a manner that the $(C_1-C_3)$-alkanol esters serve as a "carrier" for the saturated fatty acid radicals from one batch of the palmitic type oil (process step (a)) to the other batch (process step (d)) and for the unsaturated fatty acid radicals in the opposite direction. In other words, the saturated fatty acid esters which are formed in process step (a) together with the edible liquid oil, are partially reconverted (or so to say "reconstituted") in process step (d) into unsaturated fatty acid esters and these are recycled for use in the transesterification (a) of the next batch of the palmitic type oil.

It follows that in the process according to the invention the various acid residues of the original oil are redistributed between two batches of the starting oil, so that one of them is enriched with unsaturated acid residues and the other is enriched with saturated acid residues. The feasibility of this process in the manner specified hinges on the possibility to fractionate by distillation the mixture of saturated and unsaturated $(C_1-C_3)$ alkanol esters. This is turn is possible because in palmitic type oils (as herein defined) selected in accordance with the invention, the difference between the molecular weights of the saturated and the unsaturated acids is sufficient to ensure a practical difference between the boiling points of their $(C_1-C_3)$-alkanol esters.

The palmitic type oil used as starting material in steps (a) and (d) should be practically neutral and dry. The free fatty acids should not exceed 0.1% and the moisture content should be between 0.5 to 0.07%, since it has been found that minute amounts of water are essential for the transesterification reaction. It has been found that raw palm oil which has undergone a conventional caustic neutralization or a conventional physical refining is suitable for use as a starting material.

The $(C_1-C_3)$-alkyl esters used as transesterification agents can be the methyl, ethyl, n-propyl or the isopropyl ester. The ethyl esters are preferred owing to the comparatively higher reaction rate obtained therewith as compared with the propyl esters. Thus it has been found, for example, that using equal weights of oil and fatty acid ethyl esters in the trasesterification steps (a) and (d), the reaction mixture practically reaches equilibrium after about 30 minutes, if the reactions are conducted at 60° C under stirring and in the presence of 0.5% of sodium methylate.

The unsaturated fatty acid ester is preferably prepared by submitting the required amounts of the same palmitic type oil, as is used as starting material for the process, to a alcoholysis reaction with the desired $(C_1-C_3)$-alkanol, in the presence of a conventional transesterification catalyst, separating the resulting mixture of esters by vacuum distillation and recovering from this mixture the unsaturated fatty acid esters by fractional distillation. According to a preferred embodiment of the invention, where the unsaturated fatty acid ester is produced as above, the saturated fatty acid esters which are obtained by the fractional distillation are introduced into the transesterification step (d).

The transesterification catalysts used in step (a) and (d) of the process of the invention, as well as for the initial production of the unsaturated fatty acid ester described above, are preferably alkali metals or alkali metal alkoxides. Sodium and sodium methylate are the preferred catalysts and are preferably used in amounts 0.1 to 0.5% and 0.2 to 1%, respectively, based on the weight of the palmitic type oil submitted to the transesterification reaction.

The ratio between the palmitic type oil and the fatty acid esters in process steps (a) and (d) are preferably in the range of from about 1:3 to about 1:1 by weight.

The transesterification reactions in process steps (a) and (d) can be carried out at a temperature of about 40° to about 100° C, preferably from about 50° to about 80° C. The temperature in each case is chosen in accordance with the $(C_1-C_3)$-alkyl radical of the fatty acid esters, the catalyst used in the process and the desired reaction rate. The transesterification reaction is preferably carried out in vacuum or under an inert atmosphere, preferably under a nitrogen atmosphere.

Where an alkali metal or an alkali metal alkoxide is used as the transesterification catalyst, the catalyst is preferably inactivated after the completion of the reaction. This can be effected, e.g. by the addition of a small amount of water to the reaction mixture under stirring. The resultant aqueous solution of the alkali metal salts of fatty acids (soaps) separates and accumulates at the bottom of the reaction vessel, whereupon it can be drained off or removed by centrifugation.

If the transesterification catalyst is inactivated by the addition of water as described above, the reaction mixture is preferably dried before it is submitted to the fractional distillation in process steps (c) and (f). At this stage the reaction mixture may also be treated to remove any impurities and/or by-products. For example, it may be bleached with bleaching earth, preferably at a temperature of 90° to 100° C under vacuum, and thereafter filtered.

In process steps (b) and (e) the fatty acid esters are separated from the transesterified oil by distillation under reduced pressure not exceeding 40 Torr.

In the following, any distillation under reduced pressure not exceeding 40 Torr is referred to, for short, as "vacuum distillation" or "distillation under vacuum". Within the aforesaid range of 0 to 40 Torr, any convenient combination of temperature and pressure can be chosen. The vacuum distillation can thus be carried out, e.g. at a temperature of about 180° C under a vacuum of about 10 Torr. The vacuum distillation may also be effected under the above conditions with injection of water vapour into the boiling mixture.

The fatty acid ester mixtures obtained as distillates in process steps (b) and (e) are separated in steps (e) and (f), respectively, by fractional distillation under vacuum into two fractions, a lower boiling saturated fatty acid ester fraction having an iodine value of about 5 and a higher boiling unsaturated fatty acid ester fraction having an iodine value of about 95. This fractional distillation can conveniently be conducted in a conventional rectification column at a temperature of about 160° to 200° C under a vacuum of about 3 to 20 Torr.

In a modification of the process according to the invention the distillate obtained in process step (e) and the one obtained in process step (b) of a subsequent cycle of the process can be combined and fractionated into the aforesaid components in a single operation.

According to a further modification of the process of the invention, the liquid unsaturated oil obtained as product in process step (b), may be submitted to one or more further transesterification reactions with fresh or recycled portions of the $(C_1-C_3)$-alkyl ester of the unsaturated fatty acid, in order to further increase the degree of unsaturation, i.e. the iodine value, of the liquid oil product of the process. Each of these additional transesterification steps is essentially indentical with process step (a) and is followed by a separation of the resulting ester mixture by vacuum distillation as described in process step (b). Similarly, it is also possible to repeat the transesterification step (d) one or more times, each followed by a separation step corresponding with process step (e), in order to obtain a residual solid oil product consisting essentially of trisaturated triglycerides (iodine value about 5).

A liquid oil product having a particularly high iodine value can also be obtained according to a further embodiment of the invention, in accordance with which the liquid oil product obtained in process step (b), or in some or all of these steps in the case that they are repeated as described above, is subjected to winterizing whereby it separates into a crystalline oil fraction having a lower iodine value, and a liquid oil fraction having a higher iodine value, than said liquid oil product of step (b). The crystalline fraction is preferably recycled into process step (a) of a subsequent cycle of the process. In accordance with this modification of the process of the invention a liquid oil fraction having an iodine value of about 80 can be obtained by a single transesterification step (a) from natural palm oil having an iodine value of 53.

In accordance with a further embodiment of the invention, the reaction mixture obtained from the transesterification step (d), consisting of transesterified oil and mixture of fatty acid esters, is winterized, after inactivation of the catalyst but before the separation step (c). The mixture is thereby separated into a crystalline fraction consisting of crystals of a solid oil having a lower iodine value with included saturated and unsaturated fatty acid esters, and a liquid fraction consisting of a mixture of an oil having a higher iodine value and saturated and unsaturated fatty acid esters. This amounts to a fractional crystallization of the oil product using the mixture of the fatty acid esters as a solvent. In accordance with this modification of the process of the invention, the aforesaid crystalline and liquid fractions are subjected separately to the vacuum distillations corresponding to process step (e). By this vacuum distillation, the aforesaid crystalline fraction is separated into a solid oil product and a mixture of fatty acid esters (as the distillate), while the liquid fraction obtained by the winterizing is separated into a mixture of fatty acid esters (distillate) and a residual liquid oil which, according to a preferred embodiment of the invention, is recycled into process step (d) of a subsequent cycle of the process. The fatty acid ester mixtures obtained by these two separate vacuum distillations have substantially the same compositions and the same iodine values and can preferably be combined and submitted together to the fractional distillation in process step (f). In accordance with this embodiment of the invention an essentially saturated solid oil product of iodine value 5 was obtained from natural palm oil of iodine value = 53 by a single transesterification reaction (process step (d)) followed by winterizing.

The process according to the invention, optionally including the embodiments and modifications described above, can suitably be conducted in a continuous manner. In such a case the amounts of palmitic type oil introduced into process steps (a) and (d) and the amounts of unsaturated and saturated oil products recovered from process steps (b) and (e), respectively, can be adjusted so as to allow for a practically indefinite continuation of the process with the single initial portions of unsaturated and saturated fatty acid esters which were introduced into the transesterification steps (a) and (d). The inevitable losses are relatively small and can be compensated by the continuous addition of make-up amounts of unsaturated and saturated fatty acid esters.

Figure 2:
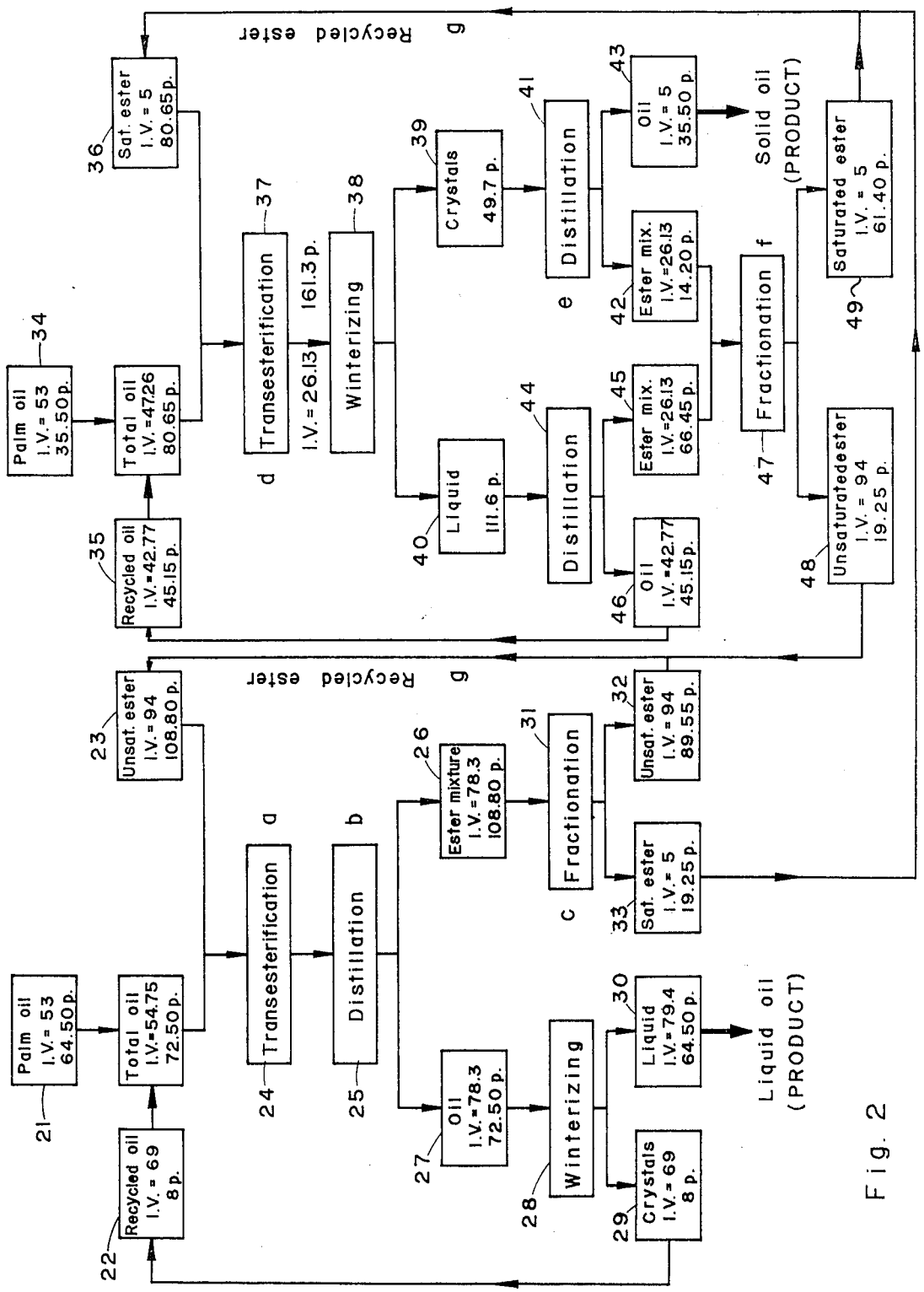

The invention is illustrated, by way of example only, in the annexed drawings, in which:

FIG. 1 is a flow diagram of one embodiment of the process according to the invention; and FIG. 2 is a flow diagram of another embodiment of the process of the invention.

In the following description with reference to the drawings, all parts are by weight.

In the embodiment of the process of the invention which is diagrammatically represented in FIG. 1 the first and the second distillates obtained in process steps (b) and (e), respectively, are combined and subjected together to a fractional distillation corresponding to process steps (c) and (f). As seen in FIG. 1 a batch of palm oil 1 and an equal weight of an unsaturated fatty acid ester of a $(C_1-C_3)$-alkanol 2 are fed to a transesterification operation at 3. The first product mixture obtained therefrom is subjected to vacuum distillation at 4 thereby to obtain as distillate 5 a mixture of saturated and unsaturated fatty acid esters of the alkanol, and as distillation residue 6 a liquid edible oil product. A second batch of palm oil 7, equal in weight to batch 1, is fed, together with the same weight of an ester of a saturated fatty acid with the same ($C_1$–$C_3$)-alkanol 8, to a second transesterification operation at 9 to obtain a second product mixture which is subjected to vacuum distillation at 10 to obtain as distillate 11 a mixture of saturated and unsaturated fatty acid esters with the alkanol and as distillation residue 12 a solid oil product. The two mixtures of esters 5 and 11 are combined and subjected to a fractional distillation (rectification) operation at 13, whereby the combined ester mixture is separated into an unsaturated fatty acid ester fraction 14 which is recycled and forms the feed 2 for the first esterification operation 3, and a saturated fatty acid ester fraction 15 which is recycled and forms the feed 8 for the second transesterification operation 9.

It is thus seen from FIG. 1 that, in accordance with this embodiment of the invention, there can be obtained, from a total of 200 parts of a starting palm oil (1 + 7) having an iodine value of 50, 100 parts of a liquid edible oil product (6) having an iodine value of 72.5 and 100 parts of a solid oil product (12) having an iodine value of 27.5. It also follows from FIG. 1 that this process can be carried out continuously because the totally required amount of unsaturated fatty acid ester feed 2 is obtained from the unsaturated fraction 14 and the totally required amount of saturated fatty acid ester feed 8 is obtained from the saturated ester fraction 15 of the rectification operation 13.

FIG. 2 is a flow diagram of a continuous process according to another embodiment of the invention. As seen in the left hand side of FIG. 2, 64.50 parts of starting palm oil 21 of iodine = 53, are combined with 8 parts of recycled oil 22 of iodine value = 69 and fed, together with 108.80 parts of unsaturated fatty acid ester 23 of iodine value = 94 to a first transesterification at 24 to form therein a first product mixture. This mixture is subjected to a vacuum distillation operation at 25 thereby to obtain 108.80 parts of a distillate 26 being a mixture of saturated and unsaturated fatty acid esters having an iodine value of 78.3, and 72.50 parts of a distillation residue 27, being a liquid oil having an iodine value = 78.3. The liquid oil 27 is subjected to a winterizing treatment at 28 whereby it is separated into 8 parts of a cystalline solid fraction 29 of iodine value = 69, which is the "recycled oil 22" referred to above, and 64.50 parts of a liquid edible oil product 30 of iodine value = 79.4. The ester mixture 26 which was obtained as the distillate from the distillation operation at 25, is subjected to a fractional distillation operation at 31 to obtain 89.55 parts of an unsaturated fatty acid ester fraction 32 of iodine value = 94 which is recycled to the first transesterification operation at 24, and 19.25 parts of a saturated fatty acid ester fraction 33 of iodine value = 5 which is recycled to the second transesterification operation at 37 described below.

As shown in the right hand side of FIG. 2, 35.50 parts of starting palm oil 34 (which is the same as the aforesaid palm oil 21) are combined with 45.15 parts of recycled oil 35 of iodine value = 42.77 and are fed, together with 80.65 parts of saturated fatty acid ester 36 of iodine value = 5, to a second transesterification at 37 to obtain a second product mixture of iodine value = 26.13. This mixture is subjected to a winterizing treatment at 38 whereby it is separated into 49.7 parts of a crystalline solid fraction 39 and 111.6 parts of a liquid fraction 40. The solid fraction 39 is subjected to a vacuum distillation operation at 41 to obtain 14.20 parts of a distillate 42 being a mixture of saturated and unsaturated fatty acid esters of iodine value = 26.13, and 35.50 parts of distillation residue 43 being a solid oil product of iodine value = 5. Likewise, the liquid fraction 40 obtained from the winterizing treatment at 38, is subjected to a vacuum distillation operation at 44 to obtain 66.45 parts of a distillate 45 being an ester mixture identical with the aforesaid ester mixture 42, and 45.15 parts of a distillation residue 46 being an oil which is the "recycled oil 35" referred to above. The two ester mixtures 42 and 45 obtained as the distillates from the vacuum distillation operations at 41 and 44 are combined and subjected to a fractional distillation at 47 to yield 19.25 parts of an unsaturated fatty acid ester fraction 48 of iodine value = 94 which is recycled to the first transesterification operation at 24, and 61.40 parts of a saturated fatty acid ester fraction 49 of iodine value = 5 which is recycled to the second transesterification operation at 37.

It thus follows that in accordance with the process illustrated in FIG. 2, it is possible to produce from natural palm oil having an iodine value of 53 a liquid oil product having an iodine value of about 80 and a chill stability of 8° C. This product can be used as a salad oil of superior quality. It is very rich in oleic acid and contains only a relatively small amount of linoleic acid and practically no linolenic acid. It is further distinguished by remarkable stability which makes it suitable for deep frying purposes.

Concommitantly with the above mentioned liquid oil product there is obtained by the process illustrated in FIG. 2, a saturated oil product having an iodine value of about 5 and a slip point of 63° C. This solid product contains over 90% palmitic acid and is an excellent raw material for shortenings, cosmetics, detergents, etc. After acid splitting or hydrolysis it provides a fatty acid product which can be successfully used as a substitute for stearic acid in most or all applications of the latter.

The fatty acid compositions of the unsaturated and the saturated oil products of the process illustrated in FIG. 2, as determined by liquid chromatography analysis are represented (as percentages by weight) in the following Table II, which includes also the composition of the starting material and, for comparison, the composition of olive oil.

Table II

Fatty acids composition of palm oil and the fractions obtained therefrom by transesterification (determined by gaschromatographic methods)

| Fatty Acids | Deacidified Palm Oil (Starting oil) | Solid Fraction | Liquid Fraction | Olive Oil |
|---|---|---|---|---|
| Myristic Acid C14/o Acid | 1.2 | 1.2 | traces | traces |
| Palmitic/C16/o | 44.8 | 91.3 | 12.7 | 7–16 |
| Stearic Acid C18/o | 4.8 | 2.3 | 6.4 | 1–3 |
| Oleic Acid C18/1 | 44.2 | 4.4 | 66.2 | 65–85 |
| Linoleic Acid C18/2 | 9.0 | 0.8 | 13.7 | 4–15 |
| Iodine Value | 53 | 5.1 | 80 | 77–94 |

The invention will be further illustrated in the following non-limiting Examples.

EXAMPLE 1

100 parts by weight of palm oil having an iodine value (I.V.) = 53 and F.F.A of 0.05 – 0.07% were mixed with 150 parts by weight of a mixture of ethyl esters of the unsaturated fatty acids contained in palm oil, having F.F.A. = 0.05 – 0.07%. The mixture was dried by heating to 150° C under vacuum, cooled to 60° C and mixed with 0.2 parts by weight of sodium methylate by stirring under a nitrogen atmosphere. Stirring of the mixture was continued under nitrogen for about 30 minutes at a temperature of 60°± 3° C, 10 parts of hot water were then added to the reaction mixture and the mixture was heated to 90° C under stirring for 10 minutes. Stirring was discontinued and the mixture was left for 1 hour whereupon an aqueous soap solution collected at the bottom of the reaction vessel and was drained off. The reaction mixture was dried, bleached with 0.5 parts by weight of bleaching earth at 90° to 100° C under vacuum and filtered.

The filtrate was distilled under a vacuum of 10 Torr. at a temperature of about 180° C, water vapour being directly injected into the boiling mixture. The distillate which consisted of 150 parts by weight of a mixture of saturated and unsaturated fatty acid ethyl esters and had I.V. = 78.3, was submitted to fractional distillation in a rectification column at a temperature of 180° C under a vacuum of 10 Torr, to yield 26.5 parts by weight of a lighter fraction having an iodine value = 5 and 123.5 parts by weight of a heavier fraction having an iodine value = 94.

The distillation residue consisted of 100 parts by weight of oil having an iodine value = 78.3. This was winterized by cooling to 8° C for 6 hours and the thus formed crystals were separated by filtration. 11 parts by weight of a crystalline solid fraction having iodine value = 69 were obtained, while the filtrate consisted of 89 parts by weight of a liquid oil of iodine value = 79.4. This liquid oil product has a chilled test stability of 8° C and contained about 80% unsaturated fatty acid (oleic and linoleic acids) as determined by GLC analysis.

The 26.5 parts by weight of the saturated fatty acid ethyl esters which were obtained above as the lighter fraction from the fractional distillation, having iodine value = 5, were mixed with 26.5 parts by weight of palm oil having an iodine value = 53 and F.F.A. 0.05 – 0.07%. The mixture was dried by heating to 150° C under vacuum, cooled to 60° C and mixed by stirring under a nitrogen atmosphere with 0.07 parts by weight of sodium methylate. The mixture was stirred under nitrogen for 30 minutes at a temperature of 60° ± 3° C. 2.65 parts by weight of hot water were added and the mixture was heated to 90° C under stirring for 10 minutes. Stirring was discontinued and the mixture left for 1 hour. After the aqueous soap solution which separated as a lower phase was drained off, the mixture was dried and bleached with 0.15 parts by weight of bleaching earth at 90° – 100° C under vacuum, and filtered. The reaction mixture was winterized by cooling to 35° C for 6 hours and then separated by filtration into a crystalline fraction and a liquid fraction which were each separately distilled at about 180° C under a vacuum of 10 Torr with direct water vapour injection.

The two distillates were combined to yield 26.5 parts by weight of a mixture of saturated and unsaturated fatty acid ethyl esters having an iodine value = 29. This mixture was separated by fractional distillation as described above into 19.4 parts by weight of a lighter fraction of iodine value = 5 and 7.1 parts by weight of a heavier fraction of iodine value = 94.

The solid crystalline fraction obtained as the distillation residue of the solid fraction, consisted of 9.3 parts by weight of an oil having an iodine = 5 and a slip point of 63° C. GLC analysis showed this fraction to contain over 90% palmitic acid. The distillation residue of the liquid fraction consisted of 17.2 parts by weight of a liquid oil fraction having iodine value = 43.

EXAMPLE 2

100 parts by weight of palm oil having F.F.A. = 0.05 – 0.07% and an iodine value of 53, were mixed with 100 parts by weight of a mixture of the ethyl esters of the unsaturated fatty acids contained in palm oil. The mixture was treated as described in Example 1 and the residual oil obtained by vacuum distillation had an iodine value = 70.

100 parts by weight of the product oil were mixed with a fresh portion of 100 parts by weight of the ethyl ester mixture of the unsaturated fatty acids and the mixture was submitted to a further transesterification by the procedure described in Example 1. After vacuum distillation there were obtained, as a residue, 100 parts by weight of a liquid oil having an iodine value = 81.

EXAMPLE 3

100 parts by weight of palm oil having F.F.A. = 0.05 – 0.07% and an iodine value of 53, were mixed with 100 parts by weight of the ethyl ester of the saturated fatty acids contained in palm oil. The mixture was submitted to transesterification as described in Example 1 and the distillation residue consisted of 100 parts by weight of an oil having an iodine value = 29.

The oil obtained as described above (100 parts by weight) was submitted to a further transesterification reaction with a fresh portion of 100 parts by weight of the ethyl esters of the saturated fatty acid. After distillation there were obtained 100 parts by weight of an oil having an iodine value = 16.

EXAMPLE 4

1000 g of palm oil having F.F.A. = 0.05 – 0.07% and I.V. = 52 were mixed with 1000 g of a mixture of ethyl esters of unsaturated fatty acids having F.F.A. = 0.05 – 0.07% and I.V. = 95. The mixture was dried by heating to 150° C under vacuum, cooled to 60° C and introduced under a nitrogen atmosphere into a reaction vessel in a continuous manner. The reaction vessel had a capacity of 400 ml, a diameter of 5 cm, a height of 20 cm and it was provided with a stirrer and a heating jacket. The oil-ester mixture was introduced into the reaction vessel at a rate of 800 g per hour by means of a dosing pump simultaneously with 20 g per hour of a suspension of 5 g of sodium methylate in 45 g of neutral palm oil, as catayst. The mixture was stirred at a temperature of 60 ± 3° C while 800 g per hour of reacted mixture were drained out of the reaction vessel. The iodine value of the oil in the drained off mixture (after distilling therefrom the fatty acid esters) was determined every half hour and the results are reprsented in the following Table:

| Samples | I.V. |
|---|---|
| Palm oil before transesterification | 52 |
| After ½ hour running | 72 |

-continued

| Samples | I.V. |
| --- | --- |
| After 1 hour running | 70 |
| After 1½ hour running | 69 |
| After 2 hours running | 71 |
| After 2½ hours running | 71 |

EXAMPLE 5

Following the procedure described in Example 4 and using the same apparatus, a mixture of 1000 g of the same palm oil and 1000 g of ethyl esters of the saturated fatty acids of palm oil having I.V. = 5, were passed through the reaction vessel at the same rate together with equal amounts of the catalyst described in Example 4. The iodine value of the product oil is represented in the following Table:

| Samples | I.V. |
| --- | --- |
| Palm oil before transesterification | 52 |
| After ½ hour running | 25 |
| After 1 hour running | 26 |
| After 1½ hours running | 27 |
| After 2 hours running | 25 |
| After 2½ hours running | 26 |

EXAMPLE 7

The procedure described in Example 1 was repeated using the isopropyl esters of the saturated and the unsaturated fatty acids instead of the ethyl esters. All the other conditions of the process were the same except that the reaction time was increased to 3 hours (instead of 30 minutes). The liquid oil product obtained after the transesterification with the unsaturated fatty acid esters and vacuum distillation had an iodine value = 76 while the saturated oil product, obtained after the transesterification with the saturated fatty acid esters and vacuum distillation had an iodine value = 26.

I claim:

1. A process of producing an improved edible liquid oil from an oil selected from amongst natural and semi-processed vegetable and animal oils and fats and mixtures thereof, and comprising saturated and unsaturated fatty acids moieties in a relative molar ratio of about 1:1 where at least 90% of the saturated fatty acid moieties contain not more than 16 carbon atom molecules, which process comprises the steps of:
   a. reacting a portion of said oil with at least one unsaturated fatty acid ester of a ($C_1$–$C_3$)-alkanol provided that where a mixture of two or more such esters are used, they are all derived from the same alkanol, in the presence of a transesterification catalyst, to form a first product mixture;
   b. subjecting said first product mixture to distillation under reduced pressure not exceeding 40 Torr, thereby to obtain a first distillate being a mixture of alkanol esters of saturated and unsaturated fatty acids, and a first distillation residue being an edible liquid oil having a higher iodine value than said oil used as starting material;
   c. subjecting said first distillate to fractional distillation under reduced pressure not exceeding 40 Torr, to separate it into a lower boiling saturated fatty acid ester fraction and a higher boiling unsaturated fatty acid ester fraction;
   d. reacting the saturated fatty acid ester fraction obtained in step (c) with another portion of said oil in the presence of a transesterification catalyst to form a second product mixture;
   e. subjecting said second product mixture to distillation under reduced pressure not exceeding 40 Torr, thereby to obtain a second distillate being a mixture of alkanol esters of saturated and unsaturated fatty acids, and a second distillation residue being an oil having a lower iodine value than said oil used as starting material;
   f. subjecting said second distillate to fractional distillation under reduced pressure not exceeding 40 Torr, to separate it into a lower boiling saturated fatty acid ester fraction and a higher boiling unsaturated fatty acid ester fraction; and
   g. recycling said unsaturated fatty acid ester fractions obtained in steps (c) and (f) to the first transesterification step (a) and recycling the saturated fatty acid ester fraction obtained in step (f) to the second transesterification step (d).

2. A process according to claim 1, wherein the iodine value of the first distillation residue is increased by subjecting it to a further transesterification reaction with unsaturated fatty acid ester of the kind specified in claim 1.

3. A process according to claim 1, wherein the iodine value of the second distillation residue is decreased by subjecting it to a further transesterification reaction with saturated fatty acid ester of the kind specified in claim 1.

4. A process according to claim 1, wherein the edible liquid oil product is winterized so as to separate a crystalline solid oil fraction having a lower iodine value from a liquid oil fraction having a higher iodine value.

5. A process according to claim 4, wherein the crystalline solid oil fraction is recycled to the first transesterification step (a).

6. A process according to claim 1, wherein the second product mixture is winterized so as to separate a crystalline solid fraction being a mixture of an oil having a lower iodine value and saturated and unsaturated fatty acid esters of the alkanol, from a liquid fraction being a mixture of an oil having a higher iodine value and saturated and unsaturated fatty acid esters of the alkanol; and each of these fractions is subjected to distillation under reduced pressure not exceeding 40 Torr, thereby to obtain as distillate a mixture of said esters and as distillation residue an oil having, respectively, a lower and a higher iodine value; the two distillates being combined and subjected together to the fractional distillation step (f).

7. A process according to claim 6, wherein the oil having the higher iodine value, obtained as distillation residue in the distillation of said liquid fraction is recycled to the second transesterification step (d).

8. A process according to claim 1, wherein the second distillate obtained in step (e) is combined with the first distillate obtained in step (b) of a subsequent cycle of the process and the combined distillates are subjected to fractional distillation in a single operation.

9. A process according to claim 1, which is carried out in a continuous manner.

10. A process according to claim 1, wherein the transesterification reactions in steps (a) and (d) are conducted at a temperature of from about 40° to about 100° C., 11. A process according to claim 1, wherein the transesterification reactions in steps (a) and (d) are carried out under an inert atmosphere.

12. A process according to claim 1, wherein in the transesterification steps (a) and (d) the ratio of the oil and the fatty acid ester or mixture of esters is from about 1:3 to about 1:1 by weight.

13. A process according to claim 1, wherein the transesterification reactions in steps (a) and (d) are conducted at a temperature of from about 50° to about 80° C.

14. A process according to claim 1, wherein the transesterification reactions in steps (a) and (d) are carried out under a nitrogen atmosphere.

* * * * *